United States Patent Office
3,049,518
Patented Aug. 14, 1962

3,049,518
POLYAMIDES FROM N,N'-BIS (3-AMINO-PHENYL)-ISOPHTHALAMIDE
Curtis Wayne Stephens, Claymont, Del., assignor to E. I. du Pont de Nemours and Company, Wilmington, Del., a corporation of Delaware
No Drawing. Filed Mar. 31, 1960, Ser. No. 18,875
4 Claims. (Cl. 260—78)

The present invention relates to a new chemical compound which is an important intermediate in the preparation of polymers such as poly(m-phenylene isophthalamide).

Poly(m-phenylene isophthalamide) or similar polyamides or copolyamides are usually made by reacting diacid chlorides with diamines, a reaction which generates hydrogen chloride. When such a polymerization reaction is carried out in solution form, the large amount of hydrogen chloride formed is particularly undesirable and at least a good portion of it should be removed before neutralization of the mixture containing the polymer.

In Belgian Patent 565,269, it has been disclosed that in order to insure good spinnability of poly(m-phenylene isopthalamide), a certain amount of a chloride or bromide salt dissociating in dimethylformamide to a certain extent should be present. This amount should be no greater than half the hydrogen chloride generated in the polymerization reaction between isophthaloyl chloride and m-phenylene diamine. If half the amide linkages in the polymer could be formed in a pre-reaction, the amount of calcium oxide necessary to neutralize the hydrogen chloride generated in the second part of the reaction would provide an acceptable amount of calcium chloride in the spin dope and insure good spinnability.

It is, therefore, an object of the present invention to provide an intermediate which can be polymerized into a high molecular weight polyamide or copolyamide without generating one molecule of hydrogen chloride for each carbon amide link in the polymer chain. Another object is to provide intermediates containing amide linkages which can be polymerized into high molecular weight copolymers. Still another object is to prepare an intermediate containing amide linkages which is suitable for the preparation of high molecular weight alternating copolyamides. Yet another object is to prepare such a copolyamide containing urethane, urea, or imide linkages.

These objects are accomplished according to this invention by the provision of N,N'-bis(3-aminophenyl)-isophthalamide. This novel composition is a white crystalline solid melting at 245° C., is stable towards discoloration in air, and is soluble in dimethylacetamide and dilute hydrochloric acid. The structural formula of this intermediate is

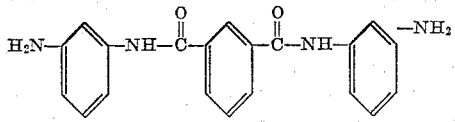

wherein the hexagons stand for aromatic nuclei. It corresponds to the formula $C_{20}H_{18}N_4O_2$.

This composition has two amide linkages and two reactive amino end groups which may be reacted under conventional polymerization conditions with diacid halides, diisocyanates, bis-chloroformates, dibasic acids, phosgene, and the like.

N,N'-bis(3-aminophenyl)isophthalamide is prepared by reacting.

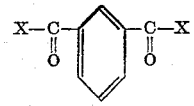

wherein X is a member of the group consisting of halogen and hydroxy with m-phenylene diamine. This reaction can be carried out in solution or in a melt system, on either a batch or continuous basis. A large excess of m-phenylene diamine is preferred where it is desired to avoid the preparation of a low molecular weight polymer rather than the intermediate.

Novel polymeric compositions are also provided in accordance with this invention and comprise recurring units of the formula:

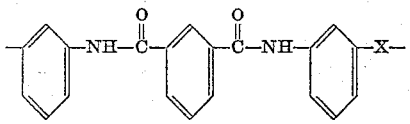

wherein X represents a radical selected from the group consisting of

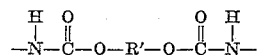

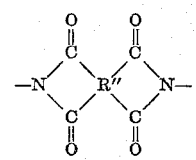

and

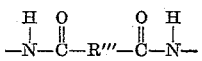

wherein R' represents a divalent organic radical, R" represents a tetravalent organic radical, preferably aromatic, and R''' represents a radical selected from the group consisting of tetramethylene, paraphenylene, and octamethylene. When X is

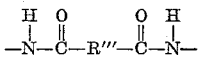

a particularly desirable alternating copolyamide is provided.

In the following examples, all parts are by weight unless otherwise indicated and all temperatures are in ° C. Inherent viscosity determinations are made at room temperature and, except for Example VIII, with 0.5 gram polymer per 100 cc. of sulfuric acid.

EXAMPLE I

A solution of 5.06 parts of isophthaloyl chloride in 66.8 parts of methylene chloride is added to a solution of 21.63 parts of m-phenylene diamine in 400 parts of methylene chloride in an "Osterizer" over a one minute period. The mixture is stirred as rapidly as possible for two minutes after the addition is completed. The precipitated reaction product is removed by filtration and the filtrate is treated with 8.66 parts of m-phenylene diamine and made up to the original volume with methylene chloride. Isophthaloyl chloride in an amount of 4.06 parts, in 66.8 parts of methylene chloride is added over a period of about one minute with continued rapid stirring. The product is filtered off and combined with the first precipitate. The filtrate is used in the same manner for another 18 times and the combined filter cakes are treated with 2500 parts of water and heated to 80° to drive off methylene chloride. After cooling to room temperature, the mixture is diluted to about 7,000 parts and acidified with concentrated hydrochloric acid. The insoluble portion, which is a low polymer of inherent viscosity 0.15 in concentrated sulfuric acid, is removed by filtration and the filtrate is treated with excess concentrated aqueous ammonia to precipitate the product which again is removed by filtration. The low polymer precipitate mentioned above is extracted with 7,000 parts dilute hydrochloric acid to dissolve residual N,N'-bis(3-aminophenyl)isophthalamide, the latter precipitated with aqueous ammonia and combined with the above ammonia insoluble portion. The combined products are dried overnight in a vacuum oven at 70° C. and represent 85.5 parts which corresponds to a yield of 62%. After recrystallizing it twice from 80% aqueous acetone, the product is suitable for the preparation of high molecular weight polymer. The yield of low polymer formed in the above reaction is found to be about 13%.

The analysis of the new intermediate gives the following values: carbon: 69.05%; hydrogen: 5.44%; nitrogen: 16.03% corresponding very closely to the calculated values 69.35% carbon, 5.24% hydrogen, and 16.18% nitrogen.

EXAMPLE II

To 27 parts of m-phenylene diamine, dissolved in a mixture of 93.4 parts of dimethylacetamide and 133.6 parts of methylene chloride cooled in a Dry Ice/acetone bath at −50° C., is added 66.8 parts of methylene chloride containing 5.08 parts of isophthaloyl chloride which also has been cooled in a Dry Ice/acetone bath to the point that the isophthaloyl chloride is just starting to crystallize. The mixture is allowed to warm up to room temperature with stirring and is left at room temperature overnight. The mixture then is added to 2500 parts of water, heated to 80° to drive off methylene chloride, acidified with concentrated hydrochloric acid, and cooled quickly in an ice bath to 35°. The resulting insoluble material is collected on a filter. The filtrate is treated with an excess of aqueous sodium bicarbonate and the product is removed by filtration and washed with water. Both products are dried overnight in a vacuum oven at 70°. The first filter cake represents 4.23 parts of poly(m-phenylene isophthalamide), the second precipitate represents 3.24 parts or 37.5% of N,N'-bis(3-aminophenyl)isophthalamide.

EXAMPLE III

Into 3.23 parts of isophthalic acid which was previously ball-milled to less than 100-mesh size, and 0.50 part of sodium hypophosphite mono-hydrate is distilled at atmospheric pressure about 25 parts of metaphenylene diamine which represents a five fold excess. The mixture is heated to 250° with stirring for 10 minutes. The reaction mixture is dumped into 800 parts of water and acidified with dilute hydrochloric acid. The mixture is then heated to a boil and filtered hot. Upon cooling to room temperature, a small amount of cloudiness develops and the mixture is filtered again. The clear solution is treated with an excess of saturated aqueous sodium bicarbonate solution. After removal by filtration, the product is washed thoroughly with water and dried overnight in a vacuum oven at 70°. It represents 5.37 parts of N,N'-bis(3-aminophenyl)-isophthalamide which calculates as a 78% yield based on the isophthalic acid used.

EXAMPLE IV

To 14.41 parts of N,N'-bis(3-aminophenyl)isophthalamide dissolved in 71 parts dimethylacetamide cooled in a bath of Dry Ice/actone at −30° is added 9.95 parts sebacoyl chloride. The mixture is allowed to warm up to room temperature and is stirred at room temperature for 20 minutes. To reduce the extremely high viscosity of this solution, its concentration is reduced to about 20% by adding about 20 parts dimethylacetamide. Another fractional amount of sebacoyl chloride (1/100–1/50) of the initial amount is added and the mixture continued to be stirred at room temperature for another ten minutes. At this point, 2.34 parts of calcium oxide are added to the mixture, which is continually stirred, until a clear solution is obtained. The solution is then heated to 110° C., and dimethylacetamide is added to reduce the concentration to 17%. This solution can easily be dry spun to produce a yarn of excellent high temperature stability and an inherent viscosity of 1.86, as measured in concentrated sulfuric acid at the concentration of 0.5 g. per 100 cc.

EXAMPLE V

A homopolymer, poly(m-phenylene isophthalamide) is prepared from an N,N'-bis(3-aminophenyl)isophthalamide and isophthaloyl chloride in a reaction analogous to the one described in Example IV for the alternating copolymer. The final solution, containing calcium chloride from the neutralization with calcium oxide, is directly dry spun through a spinneret having ten orifices of 5 mils diameter each at a temperature of 138° C. The yarn is spun into air at 220° C., wound up at 113 y.p.m. which constitutes a spin stretch factor of 2.6, extracted with cold water, drawn 4.5× in 40 pounds steam and crystallized by stretching 3% over a hot plate at 350° C. The properties of this yarn are given in Table I (column 6), column 1.

In Table I (column 6), column 2, are listed the properties of a yarn made in the same manner but by combining N,N'-bis(3-aminophenyl)isophthalamide with terephthaloyl chloride, which produces an alternating copolymer.

EXAMPLE VI

A solution of 20.00 parts of N,N'-bis(3-aminophenyl)isophthalamide in 120 parts of dimethylacetamide is cooled by means of a Dry Ice/acetone bath to a temperature of 30° below 0° C. To this cooled solution are added 9.93 parts of adipyl chloride, and the mixture is allowed to warm to room temperature. While stirring is continued, adipyl chloride, in the amount of 0.53 part, is added. After a ten minute interval, an additional 0.12 part of adipyl chloride is added, followed by 3.225 parts of calcium oxide. The resultant mixture is stirred at room temperature overnight, and a clear solution results. The copolyamide is isolated by precipitation in water, followed by washing and drying. It exhibits a melting point of 290° C., and an inherent viscosity (measured in concentrated sulfuric acid) of 1.19. A film prepared from this polymer remains tough after 350 hours exposure in a "Fade-Ometer." Films comprising this polymer are orientable by drawing.

EXAMPLE VII

N,N'-bis(3-aminophenyl)isophthalamide, in the amount of 3.46 parts, is dissolved in 20 parts of tetramethylurea, and the solution is partially frozen by means of a Dry Ice/acetone bath at a temperature of 30° below 0° C. To this solution are added 1.87 parts of ethylene bischloroformate, and the mixture is allowed to warm to room temperature. Stirring is continued for a period of four hours and a small additional quantity of ethylene bischloroformate is added to insure optimum polymerization. The reaction mixture is stirred overnight, and diluted with water, precipitating the polymer. The isolated copolyamide urethane is washed with water and acetone, and found to possess an inherent viscosity of 0.30 (measured in concentrated sulfuric acid). Its polymer melt temperature is 254° C.

EXAMPLE VIII

To 20 parts of dimethylacetamide are added 3.46 parts of N,N'-bis(3-aminophenyl)isophthalamide and to the resulting solution are added 2.50 parts of methylene bis(4-phenyl isocyanate). The reaction mixture is stirred at room temperature for a period of ½ hour, and the resultant copolyamide-urea is precipitated with water. Its inherent viscosity (as determined in dimethylacetamide containing 5% lithium chloride) is 0.26. It exhibits a polymer melt temperature of 329° C.

EXAMPLE IX

N,N'-bis(3-aminophenyl)isophthalamide, in the amount of 3.46 grams, is mixed with 2.18 grams of pyromellitic dianhydride, while blanketing the mixture with nitrogen. A mixed solvent consisting of 13.7 ml. of dry dimethylacetamide and 9.0 ml. of dry pyridine is added, and the resulting mixture is stirred while the reaction vessel is cooled in an ice bath for a period of 4 hours. The ice bath is then removed, and stirring is continued for an additional 7 hours, the mixture reaching room temperature. A viscous solution results, from which tough films may be prepared. The product is an alternating copolyamide, which may be converted to the corresponding copolyamide-imide by appropriate means. Thus, conversion may be effected by a heat treatment. A film of the polymer, on heating to a temperature of 250° C., undergoes dehydration. Conversion may also be effected by the addition of an excess of acetic anhydride to the original polymer solution, causing it to turn yellow and precipitate the product. The alternating copolyamide-imide formed by either of the above means is soluble in concentrated sulfuric acid, in which it exhibits an inherent viscosity of 0.53. The polymer is also soluble in a solution of lithium chloride in dimethylacetamide; an inherent viscosity of 0.97 is determined in this medium. Dry spinning of the latter solution results in the production of fibers.

An important advantage of the new polymer intermediate is its use as a starting material for the preparation of high molecular weight polymers. Such a polymerization can be carried out in solution and, where the new intermediate is combined with a diacid halide, only ½ mol of hydrogen halide is formed per mol of amide links of the polymer obtained. When the polymerization mixture is neutralized with calcium oxide, the calcium chloride does not have to be removed, since it serves as stabilizer for the solution which is directly spinnable. Another advantage is that the new intermediate can be formed directly from isophthalic acid without the necessity of first forming the acid halide. In other words, the preparation of polymers from the new intermediate is economically very attractive.

The described N,N'-bis(3-aminophenyl)isophthalamide is preferred in that it can easily be removed from the reaction mixture. The only slightly different oligomer from m-phenylene diamine and terephthalic acid forms an isomeric intermediate that can only be separated with such refined methods that neither product nor process seems economically attractive.

Similar intermediates such as bis(3-aminophenyl)isophthalate made from m-aminophenol and isophthaloyl chloride or isophthalic acid, or homologs of bis(3-aminophenyl)isophthalate or N,N' - bis(3 - aminophenyl)isophthalamide are unattractive for the same reasons.

It will be obvious to those skilled in the art that other inert solvents can be used in place of methylene chloride or dimethylacetamide as the reaction medium, e.g., benzene, toluene, 1,2,3,4-tetrahydronaphthalene, or the like. The catalyst sodium hypophosphite may be replaced by other catalysts known in the art to promote reaction between an acidic group and an amino group. Among these catalysts are yellow phosphorus, boric acid, sodium hydrosulfite, manganese hypophosphite, di-(2-ethylhexyl)-hydrogen phosphite, etc.

Among suitable divalent organic radicals (designated as R' above) may be named alkyl groups, as methylene, dimethylene, trimethylene, tetramethylene, pentamethylene, hexamethylene, and other higher members of this series; aryl groups, as m- or p-phenylene, divalent naphthalene radicals, and other similar aromatic divalent radicals; alkyl-aryl groups, as m- or p-xylylene, m- or p-bis(ethylene) benzene, and other similar radicals; cyclic alkyl groups, as cyclohexylene; heterocyclic groups; and other comparable radicals. The above radicals may bear one or more non-reactive substituents, as chloro groups, nitro groups, alkyl groups, alkoxy groups, etc.

Table I

| | Tenacity, g.p.d. | Elongation Percent | Initial Modulus, g.p.d. | Tenacity, g.p.d. | Elongation, Percent | Initial Modulus, g.p.d. |
|---|---|---|---|---|---|---|
| Straight | 5.5 | 28 | 113 | 4.1 | 33 | 89 |
| Loop | 3.0 | 6 | 108 | 3.4 | 19 | 65 |
| Knot | 5.0 | 17 | 91 | 4.8 | 38 | 54 |
| Straight, wet at 90° | 3.6 | 19 | 62 | 2.9 | 35 | 47 |
| Straight, air at 150° | 5.3 | 21 | 85 | | | |
| Straight, air at 250° | 3.1 | 22 | 63 | 2.7 | 48 | 38 |
| Straight, air at 300° | 1.2 | 23 | 7.5 | 1.6 | 51 | 26 |
| After 100 hrs. in Fade-Ometer | 2.5 | 3.9 | 136 | 2.1 | 8.4 | 74 |
| After 6 hrs. at 255°: | | | | | | |
| Straight | 5.1 | 20 | 111 | 4.5 | 33 | 66 |
| Loop | 1.5 | 1.9 | 104 | 2.7 | 19 | 63 |
| One day at 300° | 2.9 | 9.9 | 97 | 3.4 | 32 | 71 |
| 7 days at 300° | 1.7 | 5.7 | 77 | 1.0 | 3.1 | 50 |
| 14 days at 300° | 0.71 | 1.6 | 46 | 0.71 | 1.4 | 58 |
| Tensile Recovery at 3% percent | | 87 | | | | |
| Tensile Recovery at 5% percent | | 70 | | | 69 | |
| Work Recovery at 3% percent | | 59 | | | 52 | |
| Flex life cycles | | 415,580 | | | 605,281 | |
| Fiber stick temp. degrees | | 315 | | | 298 | |
| Zero strength temp. degrees | | 440 | | | 490 | |

I claim:
1. A composition of matter consisting of N,N'-bis(3-aminophenyl)isophthalamide.
2. A polymer intermediate of the formula:

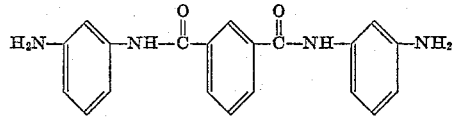

3. An alternating copolymer consisting essentially of recurring units of the formula:

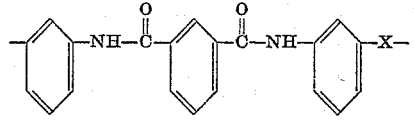

wherein X is a radical selected from the group consisting of

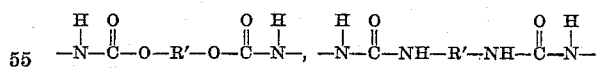

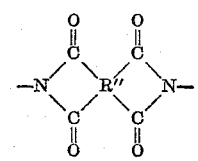

and

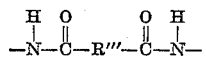

wherein R' is a divalent hydrocarbon radical, R" is a tetravalent hydrocarbon radical, and R''' is a radical selected from the group consisting of tetramethylene, paraphenylene and octamethylene.

4. A process comprising the steps of: reacting metaphenylene diamine with isophthalic acid or isophthaloyl chloride by mixing the latter with a molar excess of the diamine; treating the mixture with dilute HCl; filtering the mixture; treating the filtrate with aqueous ammonia or aqueous sodium bicarbonate; and recovering the precipitate N,N'-bis(3-aminophenyl)isophthalamide.

References Cited in the file of this patent

UNITED STATES PATENTS

| | | |
|---|---|---|
| 2,516,585 | Pease | July 25, 1950 |
| 2,696,482 | Pease | Dec. 7, 1954 |
| 2,708,617 | Magat et al. | May 17, 1955 |
| 2,766,222 | Lum et al. | Oct. 9, 1956 |

FOREIGN PATENTS

| | | |
|---|---|---|
| 1,199,458 | France | Dec. 12, 1959 |
| 1,199,460 | France | Dec. 12, 1959 |